June 18, 1963  G. T. HEMMETER  3,094,003
WHEEL BALANCER
Filed Dec. 5, 1957  7 Sheets-Sheet 2

FIG_2

FIG_6

INVENTOR.
GEORGE T. HEMMETER
BY *Lothrop & West*
ATTORNEYS

June 18, 1963 G. T. HEMMETER 3,094,003
WHEEL BALANCER
Filed Dec. 5, 1957 7 Sheets-Sheet 7

FIG_11

FIG_12

INVENTOR.
GEORGE T. HEMMETER
BY Lothrop + West
ATTORNEYS

United States Patent Office 3,094,003
Patented June 18, 1963

3,094,003
WHEEL BALANCER
George T. Hemmeter, 10791 Magdalena,
Los Altos, Calif.
Filed Dec. 5, 1957, Ser. No. 700,778
12 Claims. (Cl. 73—458)

My invention relates to devices for balancing rotating bodies and is especially concerned with a balancer of the sort shown in my Patent 2,779,196 issued January 29, 1957. While it is not limited to such use, this balancer is particularly designed for temporary application to a jacked up automobile wheel which is then spun at a relatively high speed. An operator, by manipulating control instrumentalities on the balancer, is enabled to reduce the unbalance of the automobile wheel and to get a reading of the necessary balancing weights to be attached to the automobile wheel to produce a minimum out of balance condition. The wheel balancer serves to indicate, not only the amount of the necessary added weight but also its position or circumferential location on the automobile wheel.

A number of balancers of this general type have been utilized over a period of years by all sorts of users and various practical results have appeared repeatedly. Some of these results are beneficial and others are not. It is therefore an object of this invention to correct or modify the disadvantageous features of wheel balancers.

It is another object of the invention to provide a means for temporarily attaching a wheel balancer to an automobile wheel in such a firm and secure fashion as to preclude accidental dislodgement or "flying off" under high speed rotation.

Another object of the invention is to provide a wheel balancer which can be accurately centered upon automobile wheels of different diameters.

Another object of the invention is to provide a wheel balancer which does not jam or injure itself or the operator when it arrives at an end indication of the scale.

Another object of the invention is to provide a wheel balancer of a generally improved nature.

Other objects together with the foregoing are attained in the embodiment of the invention and illustrated in the accompanying drawings and described in the accompanying description.

While the wheel balancer of the invention is susceptible to various modifications in order to fit it particularly to its intended environment, it has been utilized primarily in connection with automobile wheel balancing and is so illustrated and described herein. In that environment, there is afforded a vehicle wheel (FIGURE 3) having a rim 7 with peripheral flanges 8 and 9. The wheel 6 is usually demountable by means of nuts 11 from an axle (not shown) joined to a brake drum 12, the whole drum, axle and wheel asembly being rotatable about a rotational axis 13. The stud nuts 11 and/or lug bolts are arranged in a circle about the axis 13 as a center and vary in radius from the axis and in number depending upon the particular car on which they are found. Usually they are five in number but sometimes four are utilized and sometimes six or more.

In order to utilize the present structure, two of the nuts 11 are removed from the wheel assembly leaving sufficient nuts in tight position to serve as an adequate mounting for the wheel on the hub and axle assembly. The two stud nuts removed are temporarily put to one side and over the studs from which the nuts are removed there is slipped an adapter 14 of the sort shown in FIGURE 7 or an adapter 16 of the sort shown in FIGURE 8, or an adapter 17 of the sort shown in FIGURE 9. These adapters are primarily distinguished by their different sizes and by minor variations in contour. They are intended in no way to disturb the balance of the assembly since they, when installed, are inherently balanced. They are designed to accommodate themselves to the particular pitch circle of the lug nuts 11 and the number utilized. Often the two nuts removed are not on a diameter; i.e. when there are an odd number of lug bolts used so that the particular adapter utilized is provided with an appropriately matching contour.

Figure 7:
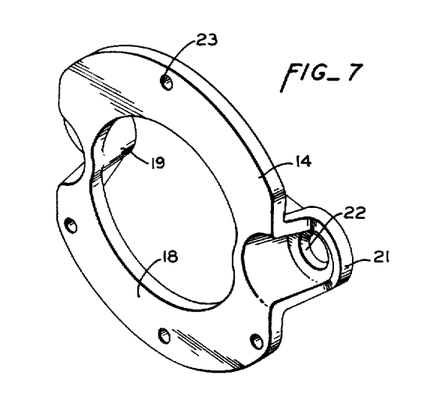
FIGURE 7 is an isometric view of one form of attachment adapter.
Figures 8, 9:
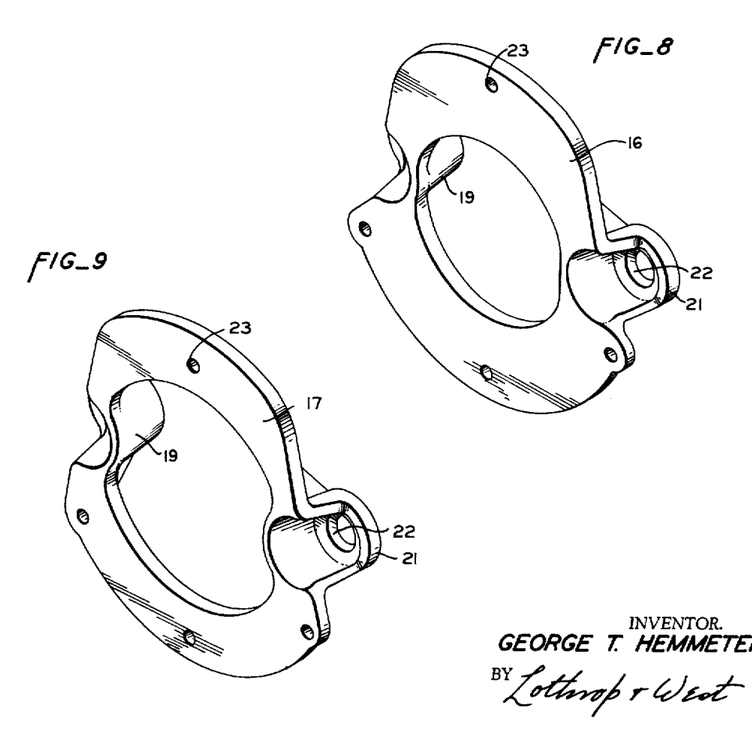
FIGURE 8 is an isometric view of another form of attachment adapter.
FIGURE 9 is an isometric view of a still different form of attachment adapter.

In any case, all of the adapters 14, 16, and 17 are provided with a disc like main member 18 of approximately the same mean diameter as the pitch circle of the nuts 11 and contoured to afford offset lugs 19 and 21 each of which has an appropriate offset aperture 22 therein to slide over the appropriate studs. The lugs 21 are sufficiently offset from the plane of the ring 18 so that those parts of the ring between the lugs overlie the remaining nuts 11 on the wheel. When the adapter is mounted, the temporarily removed nuts 11 are restored to their initial position and are tightened thus to hold the adapter in place. The nuts or lug bolts are conical so as to precisely locate the adapter with respect to the wheel.

Each adapter is provided with a plurality of concentric openings 23 equally spaced apart and equidistant from the axis 13. These are designed to receive headed bolts 24 somewhat loosely or freely. The bolts, called J-bolts, are long enough and are offset sufficiently so that they may be extended radially outward and also with an angular component toward the outside of the wheel 6.

Figure 3:
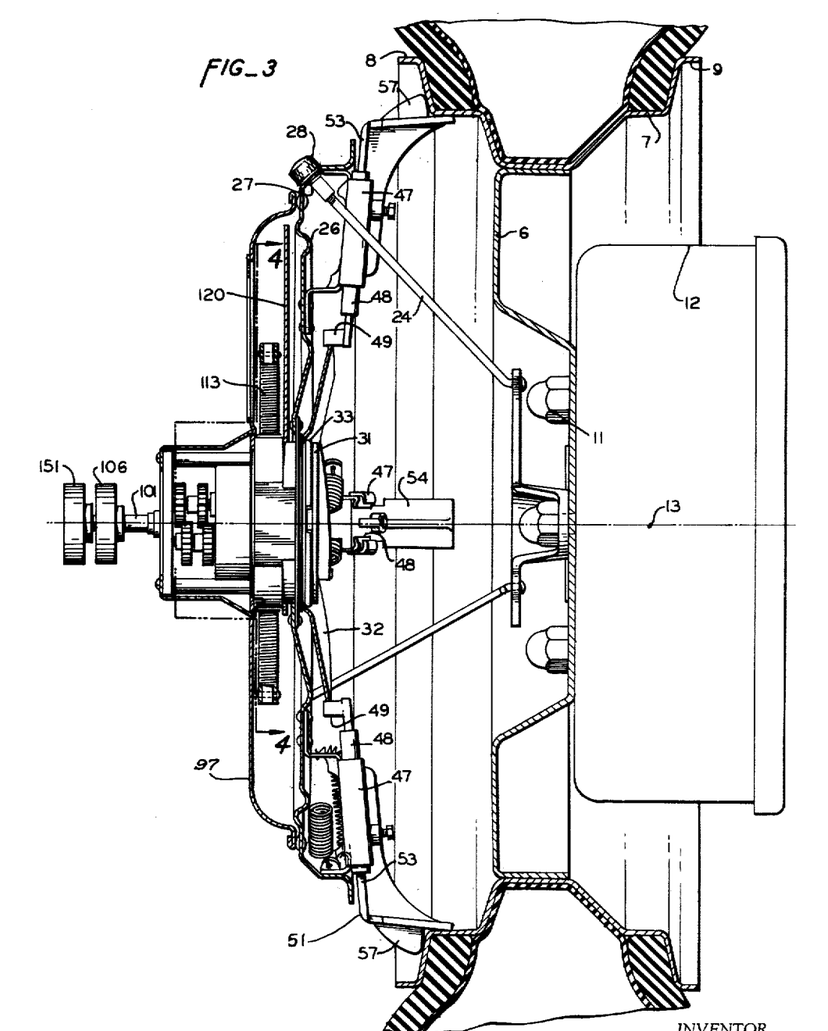
FIGURE 3 is a cross-section generally on a diametrical vertical plane through the wheel balancer, shown attached to an automobile wheel and tire assembly.

Adapted to receive each of the bolts 24 is a base plate 26 appropriately contoured and flanged to afford a relatively light but strong cup like member approximately of the diameter of the wheel 6. There is a plurality of evenly spaced openings 27 through which the bolts 24 can extend. Removable sleeve nuts 28 on the ends of the bolts 24 draw the base plate firmly toward the wheel 6, as shown in FIGURE 3. This structure is adequately strong and effective, particularly when the sleeve nuts are tightened to make sure that the balancing mechanism will remain centered.

It is important that the mechanism be accurately centered with respect to the wheel and that it rotate coaxially on the axis 13, and also that it be arranged to engage very quickly and easily with any of the various size rims which might be encountered. For that reason, there is provided a special centering device mounted on the base plate 26.

Figure 1:
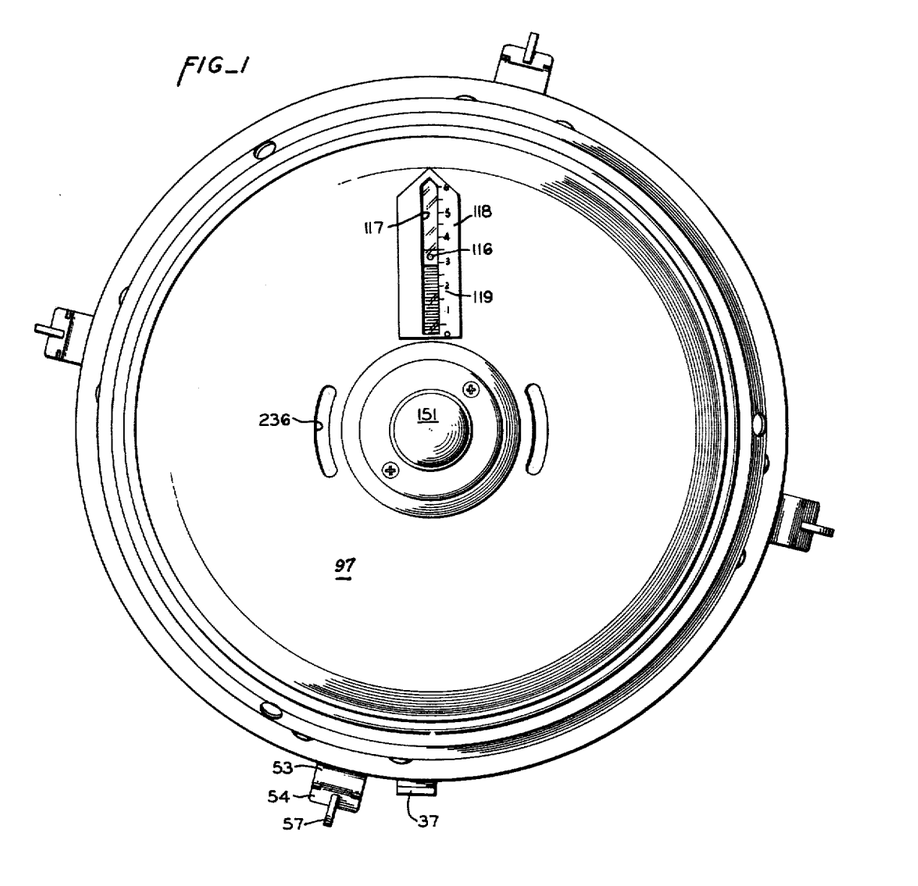
FIGURE 1 is an outside or front view of a wheel balancer constructed in accordance with the invention.
Figures 2, 6:
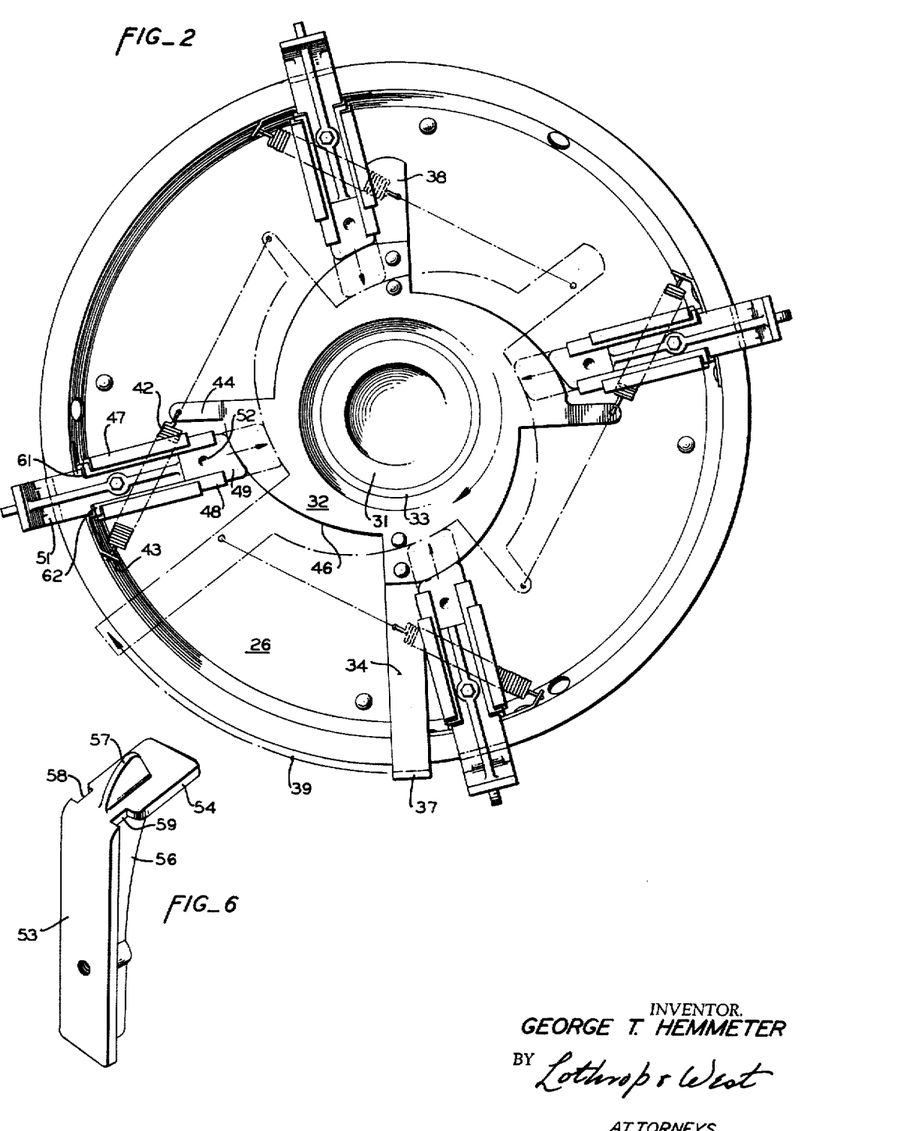
FIGURE 2 is a rear view of the wheel balancer, the full lines showing the parts in their fully extended locations while the dotted lines show the parts in their fully retracted locations.
FIGURE 6 is an isometric view of one of the improved wheel engaging members.

As especially illustrated in FIGURES 2 and 3, the base plate 26 has on it a central hub 31 or housing coaxial with the axis 13. Rotatably mounted on the hub is a central cam 32 axially restrained by a removable snap ring 33. The cam 32 is rotatable manually by means of a radial arm 34 secured to the cam and extending beyond the periphery of the base plate 26 to terminate in a hand hold 37. Since the balancing structure itself is intended to be balanced, a rudimentary extension 38 is placed on the cam 32 opposite the member 34. Preferably, the member 38 is made of steel whereas the arm 34 is of aluminum so that the extension 38, though shorter, is heavier, and so accurately balances the longer arm 34.

The arm 34 can be moved throughout the range, represented by the arrow 39 in FIGURE 2, between its full line position and its dotted line position. Motion in the direction of the arrow is effectuated manually and the return movement is accomplished by four coil springs 42. Each spring is fastened at one end to a clip 43 secured to the base plate 26 and is hooked at its opposite end into an extending ear 44 projecting from the cam 32. The cam 32 has four lobes 46 of similar configuration evenly disposed around its periphery in order to acuate four centering mechanisms. Since these are all identical, the description of one applies also to the others.

Appropriately fastened to the inner portion of the base plate 26 near an inturned flange thereof, are leg holders 47 serving as guides for radial clips 48. The clips are slidably mounted in the leg holders and are contoured closely to embrace a cam follower lug 49 and a rim engaging lug 51. The follower lug 49 has a dimpled portion 52 so that it fits into a comparable depression within the clip 48 and is securely fastened into place. The angle of contact between the lug 49 and the cam lobe 46 is such that there is a non-overhauling or irreversible connection therebetween. That is, rotation of the cam moves the lug 49 radially (and the clip 48) but radial pressure of the lug 49 does not produce rotation of the cam.

The rim lug 51 or wheel engaging member is constructed preferably as shown in FIGURE 6 having a radial portion 53 and a lug portion 54 approximately at a right angle thereto. A reinforcing web 56 permits a rigid but light structure. An external fin 57 not only reinforces the mechanism, but in certain instances acts as an axial stop against the wheel. The radial portion 53 where it joins the inturned lug portion 54 is interrupted to provide a pair of lateral notches 58 and 59 effective to pass the inturned flanges 61 and 62 of the clip 48. In some instances, when the cam mechanism is positioned so that the radial arms are fully retracted, the members 53 are withdrawn radially well within the confines of the clips 48.

The arrangement is such that the rim lug can be pulled out radially by loosening a set screw. When all four of the rim lugs have been removed, another set of four different radial dimensions can be inserted and fastened by set screws in order to adapt the mechanism to wheels of different diameters. The result of this mechanism is to provide a four armed centering device which is accurately effective with the arms being urged radially outwardly at all times by the springs 42, but being temporarily retractable for installation by appropriate manipulation of the lever 34.

In the installation of this structure, the sleeve nuts 28 are first loosely assembled. Then the operator manipulates the lever 34 against the urgency of the springs 42 to retract the various lugs 54. The base plate 26 is then accurately positioned along the axis of the wheel by the centering lugs 54 contacting the wheel bead rim 8. Thereupon the lever 34 is released by the operator and the springs 42 immediately rotate the cam so that each radial arm is urged outwardly against the bead rim 8. This outward motion centers the base plate 26 accurately on the axis 13 and also disposes the plane of the base plate 26 so that it is perpendicular or normal to the rotational axis 13. In the event there is slight play, the tendency of the springs 42 is always to tighten the radial engagement of the lugs 54 with the bead rim 8. After this has taken place, the sleeve nuts 28 are fastened firmly and the mechanism is ready for use.

The actual counterbalancing mechanism is furnished in either of two forms. Particularly in the form shown in FIGURES 4 and 5, there is rotatably mounted on the base plate 26 a central hub 71 arranged for rotation coaxially with the axis 13. The hub is provided with a shoulder 72 and a snap ring 73 and is thus freely rotatable on or with respect to the base plate 26.

Figures 4, 5:
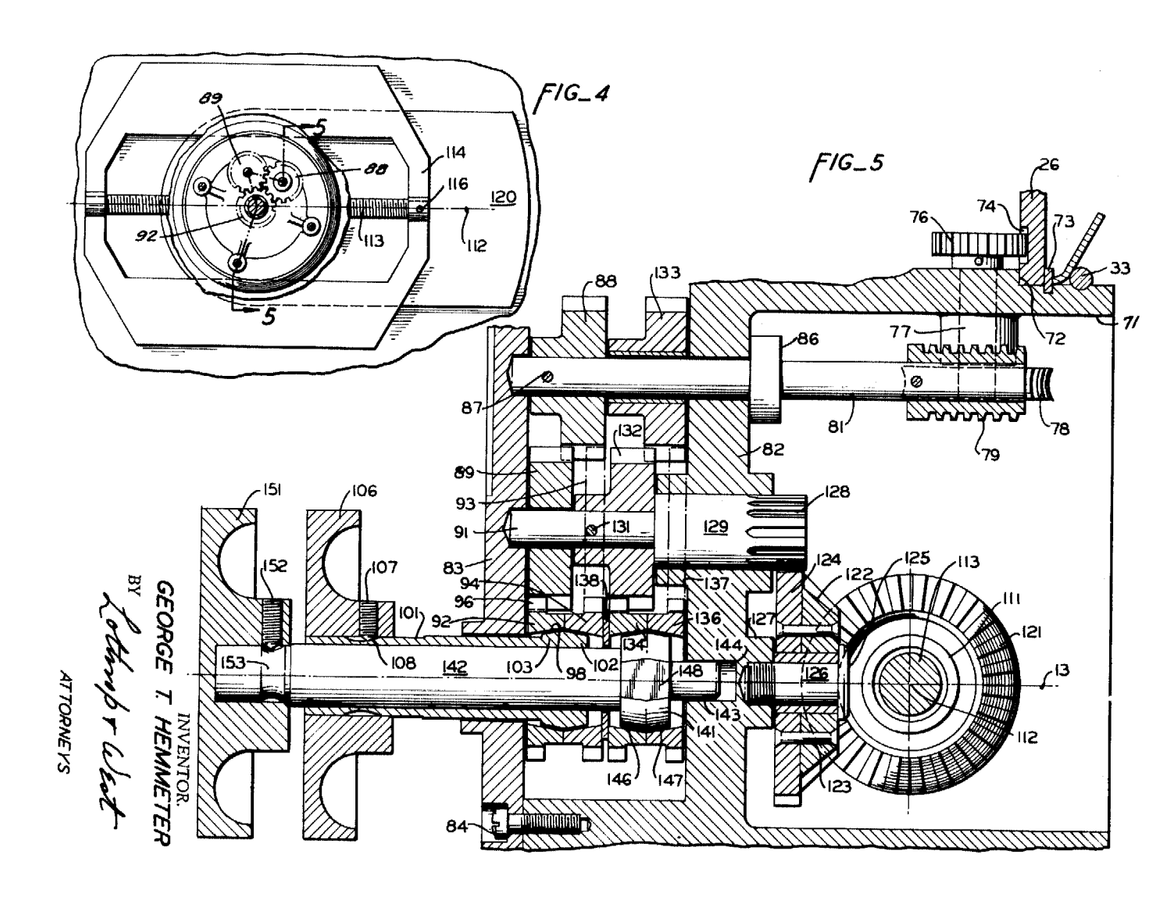
FIGURE 4 is a fragmentary cross-section, the plane of section being indicated by the line 4—4 of FIGURE 3, certain parts of the mechanism being broken away better to disclose the adjacent construction.
FIGURE 5 is a cross section to a greatly enlarged scale, the various planes of the section being indicated by the line 5—5 of FIGURE 4.

To accomplish rotation of this nature, a driving mechanism including a special gear transmission is utilized. For example, the base plate 26 is provided with a ring of perforations 74 forming a gear with which is meshed a pinion 76 fast on a transmission shaft 77 extending transversely of the hub and appropriately journalled therein. The shaft 77 at its inner end carries a worm wheel 78 with which a worm gear 79 meshes to form a one way of non-overhauling driving connection. That is, while force may be transmitted from the worm 79 to rotate the hub on the base plate 26, any returning force is ineffective to cause the wheel 78 to rotate the worm 79. A shaft 81 carries the worm 79, which is pinned thereto, and is appropriately mounted in a cross-wall 82 of the hub 71 and also in a removable cover plate 83 secured on the hub by suitable fastenings 84. A thrust collar 86 withstands the axial thrust imposed by operation of the worm 79. Fastened to the shaft 81 by an appropriate pin 87 is a driven gear 88 which is directly engaged by a reverse idler gear 89 loosely mounted on and therefore freely rotatable with respect to a shaft 91 journalled in the cover 83 and in the wall 82.

The gear 89 although of somewhat greater width is in mesh with a clutch gear 92 while the gear 88, as indicated by the broken lines 93 (FIGURE 5), is directly in mesh with a similar clutch gear 94. Both of these clutch gears 92 and 94 are disposed coaxially with the axis 13 but the imposition of the idler gear 89 necessitates a reversal of drive direction between the gear 88 and the gear 92 as distinguished from the gear 94. Each of the clutch gears is substantially like the other and is provided with gear teeth 96 around its periphery. The interior of each clutch gear is provided with a clutch surface 98 or driving surface which is for frictional engagement and conveniently is of conical contour, the cones of the gears 92 and 94 being opposite to or facing each other and being internal.

Adapted to operate coaxially with the axis 13 and within the first pair of clutch gears 92 and 94, is a tubular spindle 101 having a pair of oppositely facing external clutch cones 102 and 103 integrally formed therewith. The first spindle 101 is journalled in the cover 83 of the hub 71. The outermost end of the spindle 101 carries a control knob 106 removably secured in place by a set screw 107 seated in a peripheral groove 108 of the spindle. The arrangement of this mechanism is such that the spindle 101 is not only rotatable with respect to the hub 71 about the axis 13, but is likewise axially translatable along the rotational axis 13. A user grasping the knob 106 with his fingers can not only hold the knob from turning but can also move it axially in and out.

In the central position of the parts shown in FIGURE 5, the spindle 101 runs idly and if it is held against rotation relative to the hub 71, no effect transpires. If, however, the knob 106 is pulled toward the operator, then the clutch cone 103 is translated to engage frictionally the internal cone 98 of the clutch gear 92. This gear is then held. Rotation of the hub 71 about the axis 13 then causes the gear transmission 88 and 89 to produce a suitable and corresponding rotation of the pinion 76 to revolve the hub 71 in one direction about the axis 13.

If the knob 106 should be held and pushed, the external clutch surface 102 then engages frictionally the internal cone of the gear 94 so as to hold that gear also. This causes the planeting gear 88 to revolve on its own axis and the shaft 81 is therefore operated so that the pinion 76 causes a reverse direction of rotation about the axis 13 when the main disc 26 is revolved. Thus even though the wheel 6 always rotates in one direction about the axis 13, by appropriately pushing or pulling the held knob 106, the hub 71 and its appurtenances can be rotated about the axis 13 in either of the two opposite directions. In this way, there is a polar control of the balancing structure.

Journalled in the hub 71 is an internally threaded sleeve 111 constrained against movement along its own cross-axis 112, but freely rotatable thereon. The sleeve 111 is internally threaded to engage sleeve shaft 113 which projects freely from the hub 71 on opposite sides thereof and at its extremities is non-rotatably engaged with a counterweight 114. This is preferably a generally rectangular member which is fastened by a pin 116 to the sleeve shaft 113. The counterweight 114 is in fairly close sliding engagement with the flattened sides of the hub 71 so that the counterweight 114 is generally constrained to a translational movement along the axis 112, which is a diameter of the base plate 26. The particular instantaneous location of the counterweight is indicated by the appearance of the fastening pin 116 through a window 117 cut radially in a shield plate 97 and reinforced by an arrow frame 118 having graduations 119 thereon. As the counterweight 114 assumes different positions, the pin 116, being highly visible, is related to the graduations or indicia 119 to indicate the counterweight radial position. As in my mentioned patent, the counterweight 114 operates in conjunction with a fixed radial balance weight 120 extending along the axis 112.

In order appropriately to translate the counterweight relative to the hub 71 and to the balance weight 120, the sleeve 111 is provided with a bevel gear 121 in continuous mesh with a bevel pinion 122 secured by rivets 123 to a gear wheel 124. This assembly is rotatably mounted on a stub shaft 126 disposed axially on the axis 13 and screwed into the material of the hub 71 so that the gears 122 and 124 while freely rotatable are confined by a shoulder 127 on the hub and a head 125 on the stub shaft against axial motion. Meshing with the gear wheel 124 is a driving pinion 128 cut in the enlarged end 129 of the shaft 91, the enlargement 129 serving as a bearing support in the hub 71 for the shaft 91 in addition to its support in the cover 83.

Fastened on the shaft 91 by a through pin 131 is a gear 132 which meshes with an idler 133 freely rotatable on the shaft 81. The gear 132 meshes with a clutch gear 134 which is one of a second pair of clutch gears. The clutch gear 134 is substantially the same as the clutch gear 92 and faces clutch gear 136 similar to the clutch gear 94. The gear 134 meshes directly with the pinion 132 whereas, as shown by the dotted lines 137 the clutch gear 136 meshes directly with the idler 133. The second pair of clutch gears 134 and 136 as well as the first pair of clutch gears 92 and 94 are freely rotatable, but are restrained against any substantial axial translation by being confined between the walls of the hub 71 and of the cover 83, there being a thrust washer 138 interposed between the gears 94 and 134 for this reason.

Adapted to operate in connection with the gears 134 and 136 is a clutch member 141 integrally formed on a spindle 142 arranged coaxially with the first spindle 101. The spindle 142 has an extension 143 piloted in a bore 144 coaxially arranged within the hub 71 so that the spindle 142 is supported at its inner end as well as being rotatably supported within the spindle 101. The clutch 141 has a pair of opposed external cones 146 and 147 and preferably (as does the cone 103) has a pair of peripheral flat spots 148 to provide a small volume for accumulation of lubricant forced off of the adjacent internal cones and of the external friction surfaces of the clutch mechanism. This insures that the clutches work smoothly and firmly for a protracted period. Any excess lubricant or other material which might lodge on the friction surfaces is readily scraped off and eventually deposits on the flat portions 148.

The spindle 142 at its outermost extremity carries a knob 151 secured in position by a set screw 152 resting in a peripheral groove 153. The knob 151 can be held stationary against rotation about the axis 13 when grasped by the fingers of an operator but likewise is axially movable in and out along the axis 13. When the knob 151 is held in its central position, shown in FIGURE 5, the remaining mechanism is unaffected. When, however, the knob 151 is pushed inwardly along the axis 13 or toward the hub 71, the clutch surface 147 engages the internal cone of the clutch gear 136 which is therefore held stationary. The effect then is correspondingly to restrain the gear 136 so that the gear 133 planets about it and through the gear 132 drives the shaft 129 in a corresponding direction. The interengagement of the gears 128 and 124 as well as the bevel pinions 122 and 121 is such as to cause a rotation of the sleeve 111 to translate the screw shaft 113 in the corresponding direction along the axis 112 or diameter of the hub 71. In this fashion, since the screw shaft 113 is fixed within the counterweight 114, the counterweight is then radially or diametrically translated relative to the hub 71.

When the operator pulls the knob 151 toward himself then the clutch cone 147 is disengaged from the clutch gear 136 but the clutch cone 146 is engaged with the clutch gear 134. This then correspondingly causes the gear 132 to planet around it, the gear 132 rotating on its own axis in a direction opposite to that in which it rotated when the gear 136 was held. The interengagement of the gears 128 and 124 as well as of the gears 122 and 121 produces the opposite effect on the screw shaft 113. Thus, the counterweight 114 is translated along the axis 112 or diameter in the opposite sense. That is, the operation of the knob 151 in one axial direction produces a radially outward movement of the counterweight 114 whereas the opposite actuation of the knob 151 produces radially inward translation of the counterweight 114.

Thus by operating the knob 106 when the wheel is spinning, the operator can insure the polar or rotational motion of the counterweight 114 to any particular circumferential point with respect to the wheel 6 whereas by operating the knob 151 either inwardly or outwardly the operator can produce a radially inward or outward motion of the counterweight relative to the wheel 6. With this arrangement, it is possible to produce the desired polar and radial location of the counterweight so as to effectuate a running balance of the wheel.

While the mechanism previously described is in practice quite satisfactory for most balancing operations, there are instances in which the operator retains his grasp of the knob 151 until the mechanism approaches or attains the end of its travel. This is particularly true of the structure shown in FIGURE 4. This condition is not harmful except that it sometimes causes extra wear on the clutches if the operator persists in holding the knob 151 stationary too long. To obviate this difficulty, and to permit the use of light, long lasting clutches and for other reasons there is sometimes employed a structure more particularly illustrated in FIGURES 10, 11 and 12.

Figure 10:
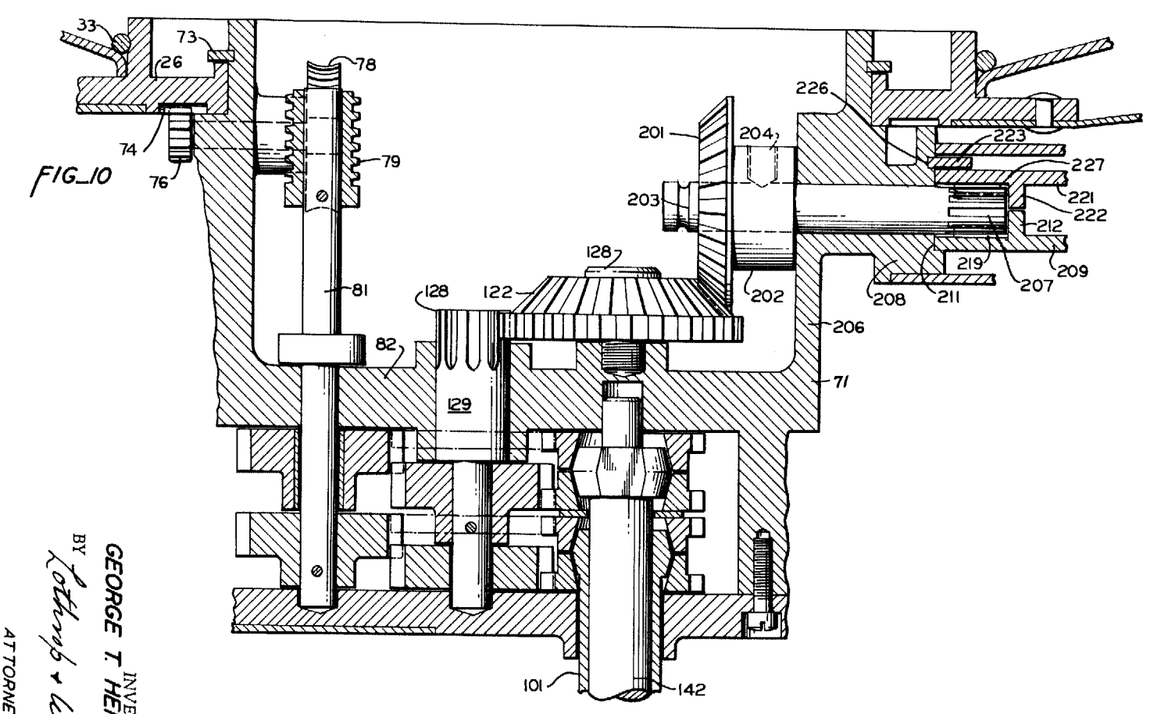
FIGURE 10 is a view, like FIGURE 5, but showing a different form of mechanism.
Figure 11:
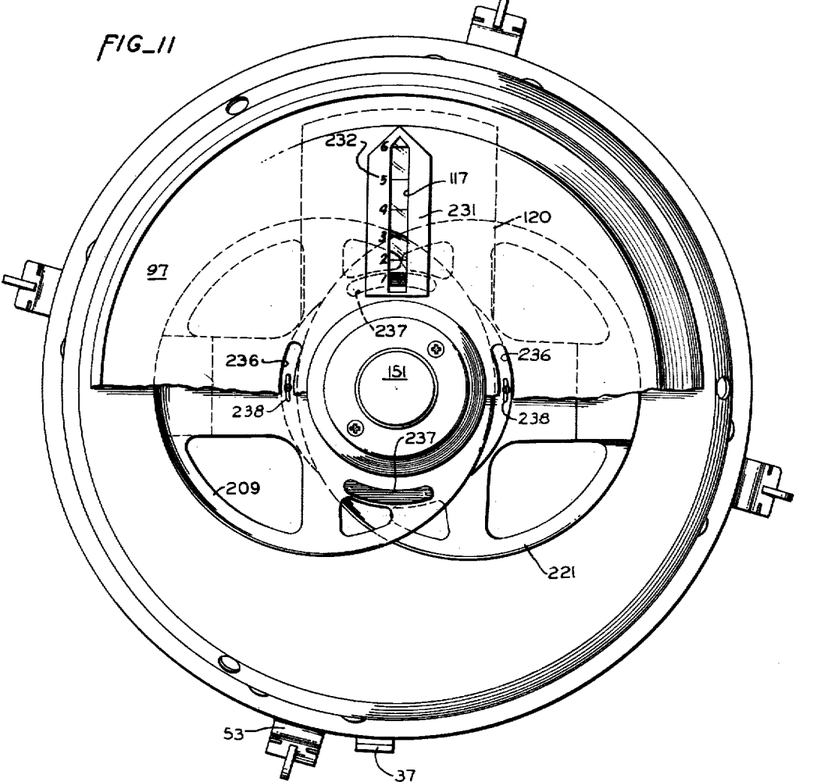
FIGURE 11 is a view, like FIGURE 1, but with parts broken away to show the different construction.
Figure 12:
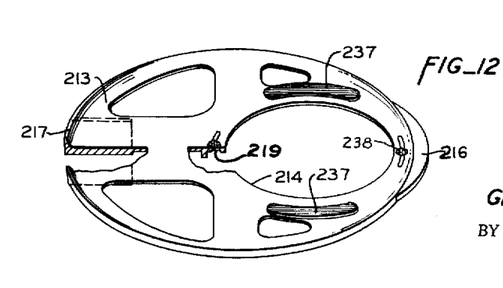
FIGURE 12 is an isometric view showing a weight used in the construction of FIGURES 10 and 11, with parts in section.

In this instance many of the parts are identical or substantially identical with those previously described and hence are represented by the same reference numerals. For example, all of the mechanism utilized to rotate the hub 71 or housing remains precisely the same. Furthermore, all of the mechanism associated with the shaft 142 is precisely the same up to and including the bevel gear 122.

In the present modification, the bevel gear 122 is in mesh with a similar bevel gear 201 having an integral hub 202. The gear 201 is held fast on a radial shaft 203 by means of a set screw 204, the hub also serving as a thrust collar against the side wall 206 of the hub 71. The shaft 203 extends radially out from the interior of the hub through a suitable journal. At its outermost extremity, the shaft 203 carries a gear 207.

Mounted on an appropriate extension 208 of the hub 71 is a thin balancing disc weight 209 having substantially the configuration illustrated in FIGURES 11 and 12. The disc weight 209 at its central portion is journalled in a groove 211 on the hub 71 and is provided with an interior annular fin 212 to serve as an axial abutment. The disc weight 209 (FIGURE 12) has an eccentric body 213 extending from its journal surface 214 concentric with the axis 13. An extra fin 216 reinforces the counterweight in the portion wherein the surface 214 is closest to the peripheral margin of the eccentric portion 213.

The disc weight 209 has a marginal flange 217 for reinforcement and also to concentrate much of the weight as far from the rotational axis as possible. Also, the disc is formed with an annular ring of gear teeth 219 preferably diecast therewith and constituting a face gear intermeshing with the teeth of the gear 207.

In an entirely comparable fashion, another disc counterweight 221 is provided on the hub 71. This second disc 221 is disposed in mirror symmetry with the counterbalancing disc 209. The abutment portion 222 thereof closely approaches or rests against the abutment 212 so that when a closure snap ring 223 is appropriately positioned in a groove 226 in the hub, the disc counterweights are appropriately fastened against consequential axial translation but are freely rotatable. They are rotated simultaneously but in opposite directions since the counterbalancing disc 221 has annular teeth 227 constituting a face gear in mesh with the gear 207 on the opposite side from the teeth 219.

The disc counterweights 209 and 221 are preferably meshed with the pinion 207 in polar positions so that they are always symmetrical with the permanent counterbalance 120. When they rotate in opposite directions they do so in equal angular amounts and in quantities dependent upon the amount of rotation of the shaft 203. In this fashion, as shown in FIGURE 11, the two disc counterweights 209 and 221 can be moved polarly in opposite directions to each other. Thus, they can be disposed in axial registration at a point remote or on the opposite sides of the center from the fixed counterweight 120 and can be moved in arcuate paths through intermediate positions opposite each other, substantially as shown in FIGURE 11, and finally can be moved until they are again in substantial registry in an axial direction and are also approximately superimposed upon or in registry over or in axial alignment with the fixed counterweight 120.

In the operation of this structure, upon the operator's arrest of the knob 151 during the rotation of the wheel 6, the two disc counterweights 209 and 221 revolve in directions opposite to each other relative to the base plate 26 or in symmetry with each other about the principal axis 13 in such a fashion that their combined or virtual center of gravity moves radially with respect to the center of gravity of the fixed counterweight 120 to afford substantially the same weight effect as the operation of the counterweight 114. There is a difference, however, in that the weights 209 and 221 never arrive at the end of any actual linear motion, but rather swing past each other and can make an indefinite number of turns in either direction. Thus, the mechanism never comes against an end point and the clutches are never required to slip for protracted periods nor is it required that the mechanism be reversed to reach a given weight setting regardless of the direction of rotation of either disc. The mechanism of the disc weights is sufficiently compact axially so that the slight difference in axial location of the two disc weights does not introduce any serious rocking couple. The arrangement is such that it can be used virtually interchangeably with the mechanism shown in the preceding figures.

In the instance of the disc counterweights, there is no indication given by any pin 116 for such mechanism does not apepar. However, the rim 217 of one of the disc counterweights, the one closest to the window 117 is not painted or colored a dark color as is the remaining part of the structure but the upstanding rim 217 is either brightened or is made bright. This rim is readily visible through the window 117 and affords an approximately horizontal but slightly inclined indicator. Since it is preferred to make the disc counterweights circular in plan, their motion behind the window 117 does not produce an equal change in indication for equal increments of change in balance. This could be arranged by utilizing disc counterweights of other than circular shape, for example, logarithmic contour. However, it is preferred to utilize a different scale 231 to frame the window 117. In this instance, the various indicia 232 on the frame 231 are arranged in an appropriate fashion, such as an adjusted scale, in order to afford a proper reading.

In addition, it is desired to provide a color indication of the approximate relative location of the balancing weights. For that reason, the shield 97 in which the window 117 is cut is also provided with one or more openings 236 through which can be seen raised portions 237 on the subjacent disc counterweight 209. The raised portions 237 are at the same radius as the openings 236 and are provided with a distinctive color, for example, red. Similar raised portions 238 may be provided with another color, for example yellow. These raised portions 237 and 238 of different colors are readily visible through the openings 236 during rotation. An appropriate color indication is thus afforded the operator during the rotation of the balancer to indicate to him approximately the position of the disc counterweights 209 and 221. With this form of mechanism, there is substantially the same overall result as to balancing the wheels but the mechanism is somewhat lighter, requires less energy to operate, is independent of rotational speed, and does not run against any stop or end condition which might cause jamming or excessive wear, and does not require reversal of clutch operation to arrive at the proper weight setting within the limits of the scale of the instrument.

What is claimed is:
1. A device for balancing wheels comprising a base fixedly attachable to said wheel for rotation therewith about the axis of rotation of the wheel, a hub mounted on said base and rotatable with respect thereto about said axis, means controllable by an operator for effecting rotation of said hub, a pair of counter-weights, means individually journalling said weights for rotation with respect to said hub about said axis in axially-spaced planes of rotation, a continuous gear fixed to each of said counter-weights to rotate therewith about said axis, gear means rotatable with respect to said hub and interacting with said continuous gears for causing simultaneous but opposite rotation of said counter-weights in either direction, means manipulatable by an operator for rotating said gear means with respect to said hub while said wheel is spinning, means in cooperative arrangement with at least one of said counter-weights for indicating the amount of unbalance of said wheel and a marker on said hub in diametric alignment with the center of gravity of the pair of counter-weights for indicating the locus of unbalance.

2. The device of claim 1 wherein each of said pair of counter-weights comprises a disc eccentrically journalled on said hub for rotation with respect thereto about said axis.

3. The device of claim 2 wherein said unbalance indicating means comprises means fixed with respect to said hub defining an elongated aperture in diametric alignment with the center of gravity of said pair of discs, a continuous line on one of said discs encircling said axis of rotation and visible through said aperture, and scale markings along the length of said aperture.

4. The device of claim 1 comprising in addition a balance weight fixed to said hub adjacent the planes of rotation of said counter-weight fixed to said hub adjacent the planes of rotation of said counter-weights and having its center of gravity radially opposite to one of the positions of the center of gravity of said counter-weights when the counter-weights are radially aligned.

5. The device of claim 1 comprising in addition means fixed to said hub defining at least one aperture elongated along an arc about said axis of rotation, different colored indicia on at least one of said counter-weights at a radius from said axis equal to the radius of said aperture, said aperture and said indicia positioned with respect to the center of gravity of said counter-weights to indicate predetermined angular positions of said counter-weights.

6. The device of claim 1 wherein said manipulatable means comprise a spindle journalled in said hub for rotation with respect thereto about said axis of rotation, and clutch and gear means operatively interconnecting said spindle to said gear means whereby manipulation of said spindle causes rotation of said counter-weights in a desired direction.

7. A deivce for balancing wheels comprising a base fixedly attachable to said wheel for rotation therewith about the axis of rotation of the wheel, a hub mounted on said base and rotatable with respect thereto about said axis, means controllable by an operator for effecting rotation of said hub, a pair of counter-weights, means individually journalling said weights for rotation with respect to said hub about said axis in axially-spaced planes of rotation, a continuous gear fixed to each of said counter-weights to rotate therewith about said axis, gear means rotatable with respect to said hub and interacting with said continuous gears for causing simultaneous but opposite rotation of said counter-weights in either direction and means manipulatable by an operator for rotating said gear means with respect to said hub while said wheel is spinning.

8. A device for balancing a wheel comprising a base plate fixedly attachable to said wheel for rotation therewith about the axis of rotation of said wheel, a hub mounted on said base plate and rotatable with respect thereto about said axis, a face gear on said base plate concentrically arranged about said axis, a transmission shaft journalled in said hub, a first pinion gear fixed to said transmission shaft and engaging said face gear, a first spindle journalled in said hub for rotation with respect thereto about said axis, oppositely directed first external clutch cones fixed on said first spindle, a first pair of separate axially-constrained clutch gears disposed within said housing surrounding said first spindle, said clutch gears having internal clutch cones substantially overlying said external clutch cones for engagement and disengagement therewith responsive to axial translation of said first spindle, means forming a forward gear connection between one of said first clutch gears and said transmission shaft, means forming a reverse gear connection between the other of said first clutch gears and said transmission shaft, a pair of equal counter-weights, means individually journalling said counter-weights for rotation with respect to said hub about said axis in axially spaced individual planes of rotation, the center of gravity of each of said counter-weights being radially displaced from said axis, continuous confronting face gears on said balance weights arranged concentrically about said axis, a second transmission shaft journalled in said hub for rotation about a second axis perpendicular to and intersecting said first axis, a second pinion gear on said second transmission shaft meshed on opposite sides thereof with said face gears, a second spindle journalled in said hub for rotation with respect thereto about said first axis, oppositely directed second external clutch cones fixed on said second spindle, a second pair of axially constrained clutch gears disposed within said hub surrounding said second spindle, said second clutch gears having internal clutch cones substantially overlying said second external clutch cones for engagement and disengagement therewith responsive to axial translation of said second spindle, means forming a forward gear connection between one of said second clutch gears and said second transmission shaft, means forming a reverse gear connection between the other of said second clutch gears and said second transmission shaft, a balance weight fixed to said hub adjacent the planes of rotation of said counter-weights and having its center of gravity radially opposite to one of the positions of the center of gravity of said counter-weights when the counter-weights are radially aligned, the weight of said balance weight being equal to the combined weight of said counter-weights, a scale fixed with respect to said hub and cooperatively arranged with at least one of said counter-weights for indicating the amount of unbalance of said wheel, and a marker fixed on said hub in radial alignment with the center of gravity of said balance weight for indicating the radius opposite the locus of unbalance of said wheel.

9. A device for balancing a wheel comprising a base plate fixedly attachable to said wheel for rotation therewith about the axis of rotation of said wheel, a hub mounted on said base plate and rotatable with respect thereto about said axis, a face gear on said base plate concentrically arranged about said axis, a transmission shaft journalled in said hub, a first pinion gear fixed to said transmission shaft and engaging said face gear, a first spindle journalled in said hub for rotation with respect thereto about said axis, oppositely directed first external clutch cones fixed on said first spindle, a first pair of separate axially constrained clutch gears disposed within said hub surrounding said first spindle, said clutch gears having internal clutch cones substantially overlying said external clutch cones for engagement and disengagement therewith responsive to axial translation of said first spindle, means forming a forward gear connection between one of said first clutch gears and said transmission shaft, means forming a reverse gear connection between the other of said first clutch gears and said transmisison shaft, a pair of equal counterweights, means individually journalling said counter-weights for rotation with respect to said hub about said axis in axially spaced individual planes of rotation, the center of gravity of each of said counter-weights being radially displaced from said axis, continuous confronting face gears on said counter-weights arranged concentrically about said axis, a second transmission shaft journalled in said hub for rotation about a second axis perpendicular to and intersecting said first axis, a second pinion gear on said second transmission shaft meshed on opposite sides thereof with said face gears, a second spindle journalled in said hub for rotation with respect thereto about said first axis, oppositely directed second external clutch cones fixed on said second spindle, a second pair of axially constrained clutch gears disposed within said hub surrounding said second spindle, said second clutch gears having internal clutch cones substantitally overlying said second external clutch cones for engagement and disengagement therewith responsive to axial translation of said second spindle, means forming a forward gear connection between one of said second clutch gears and said second transmission shaft, means forming a reverse gear connection between the other of said second clutch gears and said second transmission shaft, a scale fixed with respect to said hub and cooperatively arranged with at least one of said counter-weights for indicating the amount of unbalance of said wheel, and a marker fixed on said hub in diametric alignment with the center of gravity of said pair of counter-weights for indicating the locus of unbalance of said wheel.

10. A device for balancing a wheel comprising a base plate fixedly attachable to said wheel for rotation therewith about the axis of rotation of said wheel, a hub mounted on said base plate and rotatable with respect thereto about said axis, a face gear on said base plate concentrically arranged about said axis, a transmission shaft journalled in said hub, a first pinion gear fixed to said transmission shaft and engaging said face gear, a first spindle journalled in said hub for rotation with respect thereto about said axis, opposing directed first external clutch cones fixed on said first spindle, a first pair of separate axially constrained clutch gears disposed within said hub surrounding said first spindle, said clutch gears having internal clutch cones substantially overlying said external clutch cones for engagement and disengagement therewith responsive to axial translation of said first spindle, means forming a forward gear connection between one of said clutch gears and said transmission shaft, means forming a reverse gear connection between the other of said first clutch gears and said transmission shaft, a pair of equal counter-weights, means individually journalling said weights for rotation with respect to said hub about said axis in axially spaced individual planes of rotation, the center of gravity of each of said counter-weights being radially displaced from said axis, continuous confronting face gears on said counter-weights arranged concentrically about said axis, a second transmission shaft journalled in said hub for rotation about a second axis perpendicular to and intersecting said first axis, a second pinion gear on said second transmission shaft meshed on opposite sides thereof with said face gears, a second spindle journalled in said hub for rotation with respect thereto about said first axis, oppositely directed second external clutch cones fixed on said second spindle, a second pair of axially constrained clutch gears disposed within said housing surrounding said second spindle, said second clutch gears having internal clutch cones substantially overlying said scond external clutch cones for engagement and disengagement therewith responsive to axial translation of said second spindle, means forming a forward gear connection between one of said second clutch gears and said second transmission shaft, means forming a reverse gear connection between the other of said second clutch gears and said second transmission shaft, and a balance weight fixed to said hub adjacent the planes of rotation of said counter-weights and having its center of gravity angularly fixed radially opposite to one of the positions of the center of gravity of said counter-weights when the counter-weights are radially aligned, the weight of said balance weight being equal to the combined weight of said counter-weights.

11. A device for balancing a wheel comprising a base plate fixedly attachable to said wheel for rotation therewith about the axis of rotation of said wheel, a hub mounted on said base plate and rotatable with respect thereto about said axis, means controllable by an operator for effecting rotation of said hub, a pair of equal counter-weights, means individually journalling said weights for rotation with respect to said hub about said axis in axially spaced individual planes of rotation, continuous confronting face gears on said counter-weights arranged concentrically about said axis, a transmission shaft journalled in said hub for rotation about a second axis perpendicular to and intersecting said first axis, a pinion gear on said transmission shaft meshed on opposite sides thereof with said face gears, a spindle journalled in said hub for rotation with respect thereto about said first axis, oppositely directed external clutch cones fixed on said spindle, a pair of axially constrained clutch gears disposed within said housing surrounding said spindle, said clutch gears having internal clutch cones substantially overlying said external clutch cones for engagement and disengagement therewith responsive to axial translation of said spindle, means forming a forward gear connection between one of said clutch gears and said transmission shaft, and means forming a reverse gear connection between the other of said clutch gears and said transmission shaft.

12. In a device for balancing wheels having a base fixedly attachable to the wheel for rotation therewith about the axis of the wheel, a hub mounted on the base rotatable with respect thereto about said axis, means controllable by an operator for effecting rotation of said hub, and means for counter-balancing the unbalance in the wheel to determine the amount and locus of the unbalance, an improvement of said device wherein said counter-balancing means comprises, a pair of counter-weights, means individually journalling said weights for rotation with respect to said hub about said axis in axially spaced planes of rotation, a continuous gear fixed to each of said counter-weights to rotate therewith about said axis, gear means rotatable with respect to said hub and interacting with said continuous gears for causing simultaneous but opposite rotation of said counter-weights in either direction, and means manipulatable by an operator for rotating said gear means with respect to said hub while said wheel is spinning.

References Cited in the file of this patent

UNITED STATES PATENTS

| | | |
|---|---|---|
| 2,045,452 | Emrick | June 23, 1936 |
| 2,675,200 | Wohlforth | Apr. 13, 1954 |
| 2,723,555 | Hunter | Nov. 15, 1955 |
| 2,731,833 | Jones | Jan. 24, 1956 |
| 2,779,196 | Hemmeter | Jan. 29, 1957 |
| 2,780,939 | Kellogg | Feb. 12, 1957 |
| 2,883,024 | Emrick | Apr. 21, 1959 |
| 2,891,404 | MacMillan | June 23, 1959 |
| 2,972,256 | MacMillan | Feb. 21, 1961 |

UNITED STATES PATENT OFFICE
CERTIFICATE OF CORRECTION

Patent No. 3,094,003                      June 18, 1963

George T. Hemmeter

It is hereby certified that error appears in the above numbered patent requiring correction and that the said Letters Patent should read as corrected below.

Column 9, lines 12 and 13, strike out "counter-weight fixed to said hub adjacent the planes of rotation of said".

Signed and sealed this 19th day of October 1965.

(SEAL)
Attest:

ERNEST W. SWIDER
Attesting Officer

EDWARD J. BRENNER
Commissioner of Patents